W. H. LIEBER.
SYSTEM OF DISTRIBUTION.
APPLICATION FILED JULY 21, 1915.

1,286,671.

Patented Dec. 3, 1918.

Inventor
W. H. Lieber
by
Attorney

UNITED STATES PATENT OFFICE.

WILLIAM H. LIEBER, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

SYSTEM OF DISTRIBUTION.

1,286,671.

Specification of Letters Patent.

Patented Dec. 3, 1918.

Application filed July 21, 1915. Serial No. 41,423.

*To all whom it may concern:*

Be it known that I, WILLIAM H. LIEBER, a citizen of the United States, residing at Milwaukee, in the county of Milwaukee and State of Wisconsin, have invented a certain new and useful Improvement in Systems of Distribution, of which the following is a specification.

This invention relates in general to electrical distribution systems, and has particular relation to devices for regulating generators connected to supply variable loads, especially where there is a tendency for a generator to operate at widely different speeds.

In certain installations, as where a steam turbine drives a generator, usually through a direct connection therewith, for supplying a variable load, as for supplying lamps on a locomotive, such as the head-light and the cab lights, some means are necessary to limit the speed of the turbine on the loss of a portion of the generator load or an increase of the steam pressure at the turbine inlet. It will be obvious that, if the generator were permitted to operate at an increased speed, when a portion of its normal load is removed or the inlet pressure is increased, unless the generator field be regulated to maintain the voltage at the proper point, the voltage on the translating devices constituting the load would rise to a dangerously high value, and this is especially the case where the load comprises lamps of the incandescent type where a voltage variation of less than ten per cent. is injurious to the life of the lamps.

In accordance with this invention, improved means are provided for regulating the output of a generator, the general operating effect of the regulating means provided being to maintain a characteristic of the energy supplied by the generator substantially constant independently of speed variations thereof and to provide for this purpose an artificial load which takes the place of that portion of the lamp load removed from circuit or compensates for an increase in pressure of the working fluid that operates the generator-driving means, and acts to control the speed of such generator-driving means. This regulation may be effected in response to voltage or current, that is, slight changes in these energy characteristics may be effective to check great ones, in any case, the final regulation functioning to maintain approximately constant, or within permissible limits, the desired energy characteristic.

It is an object of this invention to provide a system of distribution comprising a generator driven by fluid-operated means which inherently functions to increase its speed on loss of load or increase in pressure of the working fluid and supplying a load of a variable character, and improved means for maintaining a characteristic of the energy supplied by said generator within desired limits independently of the load thereon or the pressure or other variable characteristic of the working fluid operating the generator-driving means.

It is a further object of this invention to provide an improved regulating device for the system described, comprising a retarding device which acts as an artificial load on the generator-driving means.

It is a further object of this invention to provide an improved regulating device for the system described, comprising a retarding device forming an artificial load on the generator-driving means, in combination with means automatically operative in response to an operating characteristic of the generator for rendering the retarding or braking device operative or inoperative.

These and other objects are attained by this invention, the various novel features of which will appear from the description and drawings, disclosing one embodiment of such invention, and will be particularly pointed out in the claims.

Figure 1:
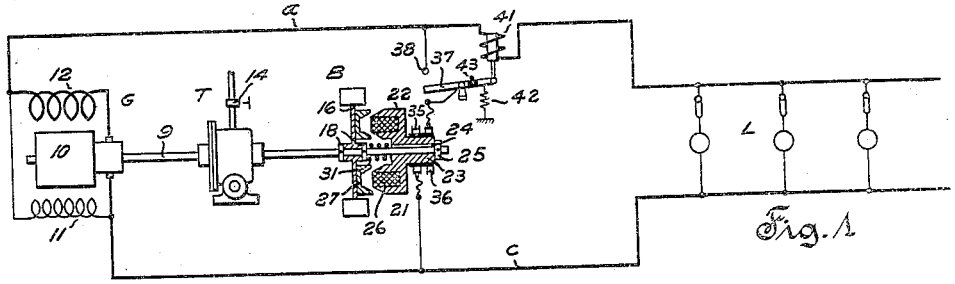
Figure 1 is a diagrammatic view of a system embodying features of this invention.

In accordance with the drawings, a generator G, shown diagrammatically, is driven by a prime mover, such as a turbine T, being preferably mounted on the same shaft 9 therewith. The armature of the generator is indicated at 10, the shunt field at 11, and the series field at 12, the machine terminals being properly connected to the distribution circuit a, c. The turbine T is provided with an inlet 14 of adjustable size, although, in the ordinary operation of the system, the inlet opening remains constant when once adjusted, this adjustment depending on the normal generator speed desired and the normal working pressure on the turbine inlet.

A braking device B is provided for operation as an artificial load on the turbine, this brake comprising a rotary fan 16, of any suitable type, loosely mounted on the shaft 9, or on a shaft mechanically connected thereto, and held against longitudinal movement on the shaft, as by collars 18 fixed to the shaft. An electromagnet 21, comprising a body portion 22 and a hub portion 23 extending from the body portion, is mounted on the shaft 9 for rotation therewith, the hub portion 23 being splined to the shaft, as by a key 24, to insure rotation of the body portion of the electromagnet and to permit longitudinal movement thereof relatively to the shaft, movement of the body portion of the electromagnet away from the fan being limited by a collar 25 secured to the shaft. An energizing winding 26 is disposed in a cup shaped part of the body portion of the electromagnet, and that part of the body portion adjacent the fan is provided with beveled polar faces for coaction with correspondingly beveled faces on an armature portion 27 secured to the rotatable fan 16. A compression spring 31 is disposed between the fan 16 and the body portion 22 of the magnet 21 and is effective to maintain the polar portions of the part 22 out of engagement with the armature portion 27 on the fan 16.

The hub portion 23 is provided with slip-rings 35, 36, the energizing winding 26 being supplied with energy from the distribution circuit a, c through brushes bearing on the slip-rings, the supply circuit for this winding being controlled by a switch 37 operable into engagement with a contact 38 to complete the circuit of the energizing winding 26. An electromagnet 41, the energizing winding of which is connected in series with one side of the line a, c, is effective, under normal conditions of load on the generator G, to hold the switch 37 away from the contact 38 and against a stop 43, this action of the magnet 41 being opposed by a spring 42 which tends to operate the switch 37 to closed position.

The distribution circuit a, c is shown as supplying a plurality of lamps or other translating devices L, the load being generally described as being of a variable nature.

In the operation of the system disclosed in Fig. 1, the inlet 14 of the turbine T is adjusted to cause the turbine to operate at such speed as results in the production by the generator G of current of the desired voltage with the normal load connected in circuit, the connections at this time being as shown. It will be apparent that, due to the inherent characteristics of the turbine, with a definite inlet opening and pressure, which may be assumed in this case, the speed of the turbine will vary inversely as the load thereon. Hence, the regulation provided must be such as will, with a definite inlet opening, properly compensate to maintain the voltage on the load substantially constant, or within safe limits, independently of the amount of this load.

When a portion of the normal load is removed, as when one or more of the translating devices L are cut out of circuit, the current passing through the energizing winding of the magnet 41 is appreciably decreased, and, depending on the design of such magnet, the effect of the spring 42 will, under certain conditions, exceed that of the magnet on the switch arm 37, with the result that the arm 37 is moved into engagement with the contact 38 thus closing the circuit of the energizing winding 26 of the electromagnet 21. On energization of this magnet, the body portion 22 of the magnet is moved along the shaft until the polar portions of this part 22 and the armature 27 on the fan are in engagement. The magnetic attraction between these parts is sufficient to hold the fan clutched to the rotating body portion of the electromagnet, the fan being thus added as an increment of load on the turbine shaft 9. The action of this additional load is to prevent speeding up of the turbine which would otherwise occur on the loss of a portion of the normal generator load, such speeding up causing an unwarranted increase in the voltage at the generator terminals and on the distribution circuit a, c.

The electromagnet 41 and the fan 16 may be so designed that the fan is thrown in as an additional load on the turbine when the voltage on the translating devices L, remaining in circuit after the removal of one or more devices from circuit, reaches a limiting high value. It will be understood that, due to the fact that the series field winding on the generator may be depended on as an assisting voltage-regulating feature, holding down the voltage to some extent as the load goes off, an appreciable amount of the normal generator load may be removed, without exceeding a permissible voltage, before the fan is thrown in as an artificial load or brake on the turbine. The fan may be of such design that, with the remaining translating devices in circuit, the generator speed is not reduced beyond a point which results in a permissible voltage on the translating devices.

Figure 2:
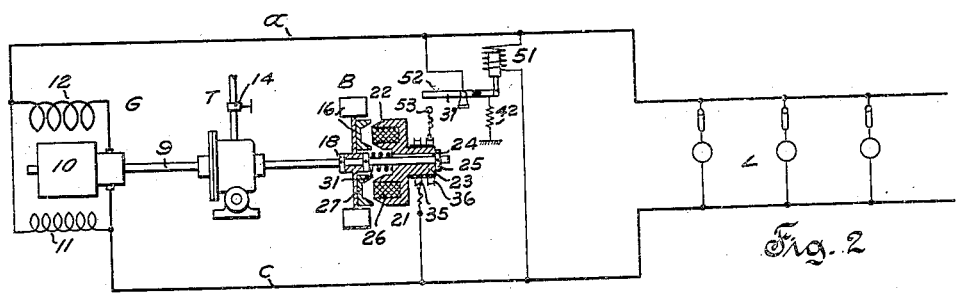
Fig. 2 is a diagrammatic view of a modification of the system shown in Fig. 1.

In the system disclosed in Fig. 2, a voltage responsive magnet 51 is used for operating the switch 37, instead of a current responsive magnet similar to the magnet 41 of the system of Fig. 1. In this system of Fig. 2, under normal load conditions, the effect of the spring 42 is greater than that of the magnet 51 and the switch arm 37 is held against a stop 52 and out of engagement with the fixed contact 53. When the electromagnet 51 is operative to overcome the spring 42, the switch 37 is moved into engagement with contact 53 thus completing the circuit of the energizing winding 26 of the electromagnet 21 and causing the fan to be clutched to the turbine shaft 9 through the electromagnet, the fan at this time operating as an additional load on the turbine.

Under conditions of normal load on the generator of the system of Fig. 2, the voltage across the load elements is insufficient to cause actuation of the magnet 51. When one or more of the load elements are cut out of circuit, the effect of the loss of generator load is to cause the turbine to speed up and thus immediately increase the generator voltage. However, on slight increase of generator voltage beyond a predetermined point, the magnet 51 is sufficiently energized to operate the switch 37 to complete the circuit of the energizing winding 26 of the electromagnet, causing energization of the magnet and the consequent clutching of the fan to the turbine shaft to act as an increment of load which has the effect of holding down the speed of the turbine to a point wherein a predetermined voltage value will not be exceeded. Likewise where the increase in voltage on the load is due to an increase in pressure at the inlet of the turbine, with a consequent increase in generator speed, the action of the voltage responsive magnet and the switch 37 is such as causes the connection of the fan to the turbine shaft to act as an additional load for the purpose of holding down the turbine and generator speed.

Figure 3:
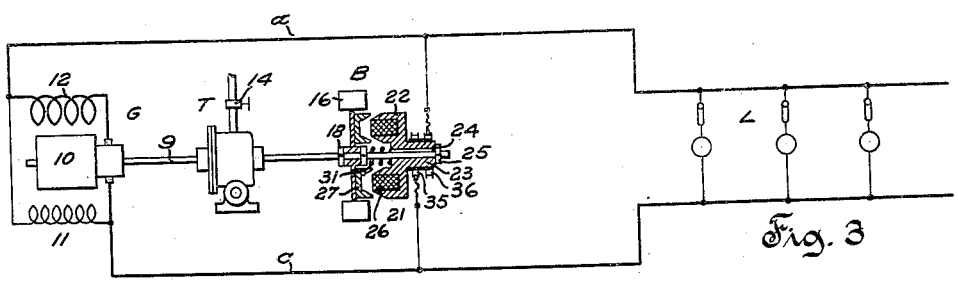
Figs. 3 and 4 are diagrammatic views of systems embodying modifications of the form of invention shown in Fig. 1.

In the system disclosed in Fig. 3, the energizing winding 26 of the electromagnet 21 is permanently connected, through its slip-rings and brushes, across the sides of the distribution circuit a, c, the electromagnet being so designed that, when the voltage across the generator terminals and the sides of the circuit a, c exceed a predetermined value, the resultant energization of the magnet is sufficient to cause movement of the body portion 22 thereof, against the action of the spring 31, into engagement with the armature portion 27 mounted on the fan 16, this action resulting in the clutching of the fan so that the same operates as an additional load on the turbine shaft. When the voltage drops below a predetermined value, the attractive force of the magnet is overbalanced by the spring 31 and the body portion of the magnet is moved out of clutching engagement with the armature portion 27 on the fan. It will be apparent that the fan will be operated as an artificial load on the turbine on any predetermined increase in voltage on the distribution circuit, whether this is due to a loss of generator load or an increase in pressure at the inlet of the turbine.

Figure 4:
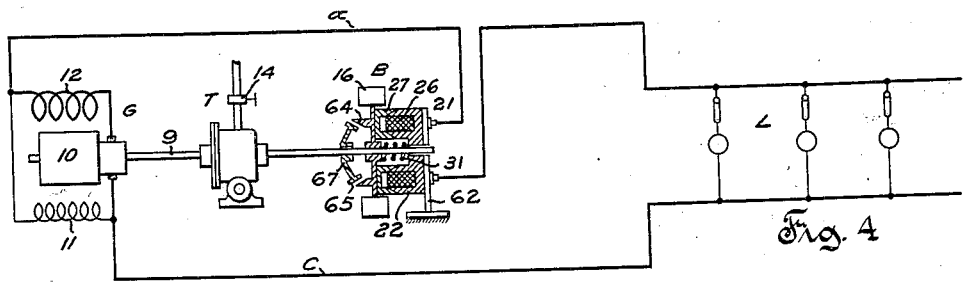

In the system of Fig. 4 there is disclosed a modified form of braking device. In this system, the magnet 21 is mounted on a fixed support 62, the body portion of the magnet being held stationary at all times, thus avoiding the necessity of slip-rings and cooperating brushes for supplying energy to the winding 26 of the magnet. The fan 16 is mounted loosely on the turbine shaft 9 and, in addition, is capable of longitudinal movement on the shaft, the fan being held away from the body portion 22 of the magnet by the spring 31, with a clutching surface 64 of the fan in engagement with a clutching surface 65 mounted on a support 67 fixed to the shaft 9. In this position, the fan acts as an artificial load on the turbine to hold down the speed of the same. As shown, the energizing winding 26 of the electromagnet 21 is connected in series with one side of the distribution circuit a, c and, hence, the energization of the magnet varies as the current in this circuit.

Under normal conditions of load on the generator of this system, the current in the circuit a, c is sufficient to cause such energization of the magnet 21 as results in the attraction of the armature 27 on the fan 16 with the consequent holding of the fan in unclutched relation to the turbine shaft, the fan being held stationary at this time. On the loss of a portion of the generator load, as by cutting one or more of the load elements out of circuit, the spring 31 overpowers the electromagnet and forces the clutching surface 64 of the fan into engagement with the fixed clutch surface 65 of the support 67, the fan then acting as a load on the turbine to prevent speeding up of the same due to the loss of a portion of the generator load, thus holding down the voltage at the generator terminals and on the distribution circuit a, c.

It will be obvious that the system of Fig. 4 may be modified along the lines suggested by the system of Fig. 1, that is, instead of having the winding 26 of the electromagnet 21 permanently in circuit, a current operated relay, similar to the magnet 41 and switch 37 of Fig. 1, may be used for causing the connection of the winding 26 in circuit only when the current in the distribution circuit $a$, $c$ reaches a certain predetermined limiting value.

It will be apparent that in so far as the general features of the system are concerned, the braking devices of the systems shown in Figs. 1, 2 and 3 may be reorganized along the general line of the system shown in Fig. 4 where the body portion of the electromagnet 21 is stationary and the fan or a coöperating clutch part is longitudinally movable on the shaft into or out of clutching engagement with the other part to cause the fan to act as a load on a turbine.

Figure 5:
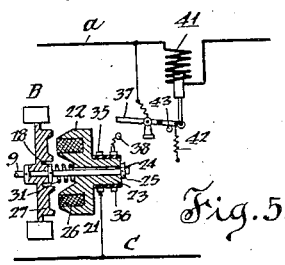
Figs. 5 and 6 show modifications of Figs. 1 and 4 respectively.
Figure 6:
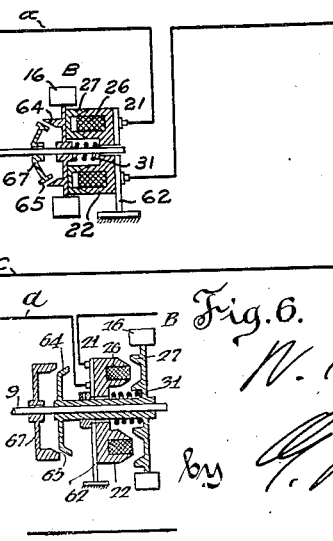

The system of Fig. 4 and that of Fig. 1, with the action of the magnet 41 and switch 37 changed so that the switch is in open position under normal conditions and is closed on increase in the current above normal, may operate, with the several load elements permanently connected in circuit, to maintain constant voltage or current in the system independently of variations in pressure at the turbine inlet. Figs. 5 and 6 show one way in which Figs. 1 and 4 may be modified in order to obtain the results above indicated.

It will be obvious that the fan and clutch-operating devices of the systems of Figs. 2 and 3 may be so designed that the fan, when clutched to the turbine shaft, undercompensates for changes in voltage, that is, the fan is permanently clutched to the shaft while the load is abnormal; or these elements may be so designed that the fan overcompensates for changes, that is, the momentary effect of clutching the fan to the shaft is to cause such decrease in the voltage as causes release of the fan from clutching relation with the shaft, the voltage pulsating between permissible limits to maintain a desirable average during conditions of abnormal load or pressure at the turbine inlet.

Again, the fan, the electromagnet for rendering the fan operative as a brake and the spring between the electromagnet and the fan may be so designed that the force holding the fan in clutched relation to the shaft may vary in the same sense as the voltage on the line, that is, between its permissible limits, this resulting in the fan acting as a variable load, there being more or less slippage between the fan and the element with which it is clutched depending on the effective energization of the brake-operating electromagnet.

It will be apparent that, in accordance with this invention, a system of distribution is provided wherein a brake is rendered effective to act as such artificial load on a prime mover driving the generator which supplies the system as causes the voltage or current of the system to be maintained substantially constant independently of variations in the load on the generator or the pressure or other characteristic of the working fluid operating the prime mover.

It should be understood that it is not desired that the invention, claimed, be limited to the exact details of construction shown and described, for obvious modifications will occur to a person skilled in the art.

It is claimed and desired to secure by Letters Patent:

1. In combination, a generator, means for driving said generator, a fan, and means comprising an electromagnet having relatively movable parts for mechanically connecting said fan to said generator and said driving means to act as a brake thereon, one of the relatively movable parts of said electromagnet being mounted on said fan.

2. A generator connected to supply energy to a variable load, means for driving said generator, a fan, and means comprising an electromagnet having relatively movable parts for mechanically connecting said fan to said generator and driving means to act as a brake thereon, said electromagnet being operative in response to variations in a characteristic of the energy supplied by said generator.

3. In combination, a generator, means for driving said generator, and a braking device for said generator and said driving means comprising a fan and an electromagnet having relatively movable parts for mechanically connecting said fan to said generator and said driving means, one of said relatively movable parts of said electromagnet being mounted on said fan.

In testimony whereof, the signature of the inventor is affixed hereto.

WILLIAM H. LIEBER.